United States Patent
Kim

(10) Patent No.: US 12,336,663 B2
(45) Date of Patent: Jun. 24, 2025

(54) SYSTEM AND METHOD FOR CONTROLLING DELIVERY DEVICE

(71) Applicants: Hyundai Motor Company, Seoul (KR); Kia Corporation, Seoul (KR)

(72) Inventor: Se Hwan Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/237,103

(22) Filed: Aug. 23, 2023

(65) Prior Publication Data

US 2024/0324818 A1 Oct. 3, 2024

(30) Foreign Application Priority Data

Mar. 31, 2023 (KR) .................. 10-2023-0042931

(51) Int. Cl.
*A47J 43/00* (2006.01)
*G06Q 10/0832* (2023.01)

(52) U.S. Cl.
CPC .......... *A47J 43/00* (2013.01); *G06Q 10/0832* (2013.01); *A47J 2202/00* (2013.01)

(58) Field of Classification Search
CPC .... G06Q 10/0832; A47J 43/00; A47J 2202/00
See application file for complete search history.

(56) References Cited

U.S. PATENT DOCUMENTS

| | | | |
|---|---|---|---|
| 8,711,562 B2 | 4/2014 | Morita | |
| 11,511,599 B2 | 11/2022 | Maeng | |
| 11,681,295 B2 | 6/2023 | Jang et al. | |
| 2002/0035515 A1* | 3/2002 | Moreno | B65G 1/0485 340/5.73 |
| 2012/0229979 A1* | 9/2012 | Morita | H05K 7/20136 361/695 |
| 2020/0047587 A1 | 2/2020 | Maeng | |
| 2021/0096572 A1 | 4/2021 | Jang et al. | |
| 2021/0162835 A1 | 6/2021 | Hyatt | |
| 2021/0188034 A1* | 6/2021 | Meador | B60H 1/00014 |
| 2024/0221447 A1* | 7/2024 | Nunez | G06Q 10/0832 |

FOREIGN PATENT DOCUMENTS

| | | |
|---|---|---|
| JP | 5464158 B2 | 4/2014 |
| KR | 101219402 B1 | 1/2013 |
| KR | 10-2019-0107612 A | 9/2019 |
| KR | 10-2019-0117417 A | 10/2019 |
| KR | 10-2021-0122008 A | 10/2021 |

OTHER PUBLICATIONS

Zhang, M., Ye, L. & Hu, L. Temperature Control Strategy of Passenger Compartment Based on Control Algorithms. Int.J Automot. Technol. 24, 35-43 (2023) (Year: 2023).*

* cited by examiner

*Primary Examiner* — Ibrahim N El-Bathy
(74) *Attorney, Agent, or Firm* — Banner & Witcoff, Ltd.

(57) ABSTRACT

A system for controlling a delivery device comprises a server to transmit a target temperature for transporting a delivery item, and a delivery device to control a temperature of a compartment by determining whether the compartment should be heated or cooled, based on the target temperature for the delivery item, which is received from the server, when the delivery item is determined as being placed in the compartment, and control an operation of a heat managing device to control flow of air based on the temperature of a controller, which controls an operation of the delivery device, and the temperature of the compartment.

20 Claims, 9 Drawing Sheets

SYSTEM AND METHOD FOR CONTROLLING DELIVERY DEVICE

CROSS-REFERENCE TO RELATED APPLICATION

This application claims the benefit of priority to Korean Patent Application No. 10-2023-0042931, filed in the Korean Intellectual Property Office on Mar. 31, 2023, the entire contents of which are incorporated herein by reference.

TECHNICAL FIELD

The present disclosure relates to a system and a method for controlling a delivery device.

BACKGROUND

A delivery device may be mounted on various mobility devices such that products, such as food, may be delivered to a customer from a store supplying the product (e.g., where the food is prepared). It may be desired to maintain an appropriate temperature of the product (e.g., food). To manage the temperature of the delivery device, the delivery device may be equipped with a device capable of serving as a heater and/or a cooler. The device consumes an additional current, thereby reducing the operating time of the delivery device between charging, battery replacement, fuel replacement, etc.

The delivery device may include a controller to control driving of the delivery device, and the controller may emit heat, depending on its operation. Since excessive heat emission causes performance degradation, an additional cooling device may be provided to maintain the controller is maintained at or below a specific temperature. However, the cooling device also consumes an additional current, thereby reducing an operating time of the delivery device.

Therefore, it is desired to develop a technology to manage the temperature of the delivery device and the heat emission of the controller to increase the operating time and the cruising distance of the delivery device.

SUMMARY

The following summary presents a simplified summary of certain features. The summary is not an extensive overview and is not intended to identify key or critical elements.

Systems, apparatuses, and methods are described for a controlling a delivery device. A system for controlling a delivery device may comprise a server configured to transmit a target temperature for transporting a delivery item; and the delivery device configured to control a temperature of a compartment by: based on the delivery item being determined to be in the compartment, determining whether the compartment should be heated or cooled based on the target temperature, for transporting the delivery item, received from the server; and causing a heat managing device to control a flow of air through the delivery device based on a temperature of a controller of the delivery device and the temperature of the compartment.

A method for controlling a delivery device may comprise: receiving, from a server, a target temperature for transporting a delivery item in the delivery device; and controlling, by the delivery device, a temperature of a compartment of the delivery device by: based on the delivery item being determined to be in the compartment, determining whether the compartment should be heated or cooled based on the target temperature for the delivery item; and causing a heat managing device to control a flow of air through the delivery device based on a temperature of a controller of the delivery device and the temperature of the compartment.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
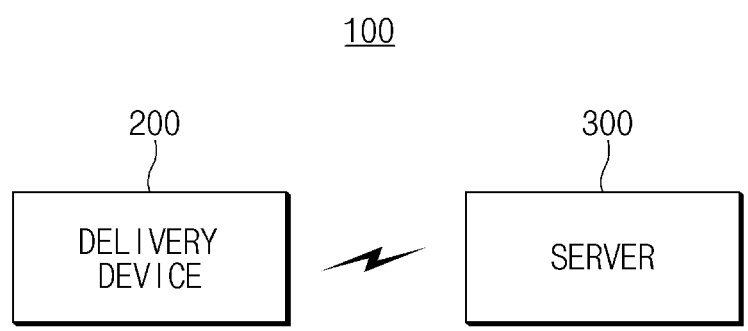
FIG. 1 is a view illustrating a configuration of a system for controlling a delivery device, according to an example of the present disclosure.

Hereinafter, some examples of the present disclosure will be described in detail with reference to the accompanying drawings. The same reference numerals indicate the same components across the drawings. In addition, a detailed description of well-known features or functions will be omitted in order to avoid obscuring the gist of the present disclosure with details of what is already known.

In describing the components of the example according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a system for controlling a delivery device, according to an example of the present disclosure.

As illustrated in FIG. 1, a system 100 for controlling a delivery device according to an example of the present disclosure may include the delivery device 200 and a server 300.

The delivery device 200 may determine whether heating or cooling of a compartment 240 is required based on a target temperature of a delivery item. The target temperature may be received by the delivery device 200 from the server 300, e.g., if the delivery item is (e.g., placed) in the compartment 240. The target temperature may be used to control a temperature of the compartment 240. The temperature of the compartment 240 may be controlled by control of a flow of air through the compartment 240. The control of the flow of air may be based on the temperature of a controller of the delivery device and the temperature of the compartment 240 (e.g., relative to the target temperature).

The server 300 may transmit, to the delivery device 200, the target temperature for transporting the delivery item, e.g., based on the delivery item being detected in and/or placed in the compartment 240, and/or based on determining the delivery item was placed in the compartment 240. According to an example, the delivery device 200 may request the transmission of the target temperature for the delivery item (e.g., based on the delivery item being detected in and/or placed in, and/or based on determining the delivery item was placed in the compartment 240), the server 300 may transmit the target temperature to the delivery device 200.

Figure 2:
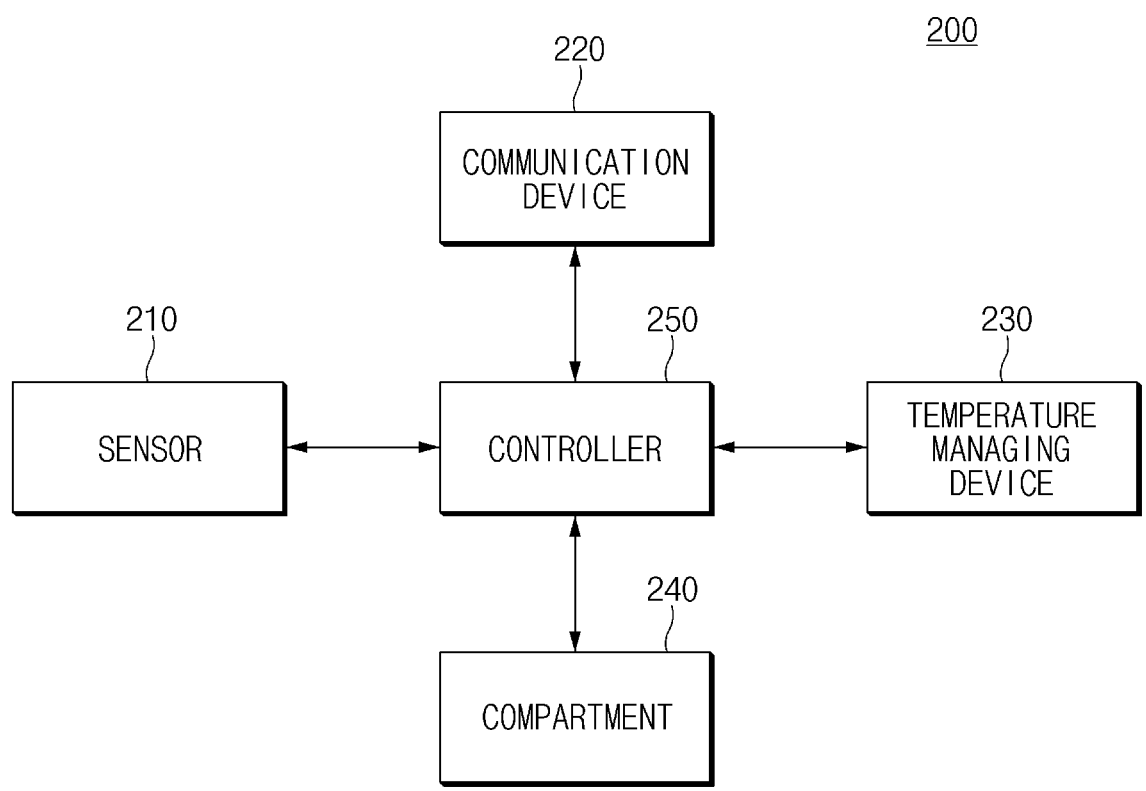
FIG. 2 is a view illustrating a configuration of a delivery device, according to an example of the present disclosure.

FIG. 2 is a view illustrating a configuration of a delivery device according to an example of the present disclosure.

As illustrated in FIG. 2, the delivery device 200 may include a sensor 210, a communication device 220, a temperature managing device 230, a compartment 240, and a controller 250. In addition, although not illustrated, the delivery device 200 may comprise a mobility device capable of movement. The mobility device may include, for example, one or more structures, components and/or devices that facilitate movement of the delivery device 200. For example, the mobility device may comprise an autonomous vehicle, a drone, a micro-mobility device, and/or an electric vehicle. The delivery device 200 may operate according to and/or may comprise one or more services, such as a vehicle call, car sharing, ride sharing, and/or smart logistics.

The sensor 210 may include one or more temperature sensors configured to sense one or more temperatures. According to an example, the one or more temperature sensors may be provided outside the delivery device to sense an external temperature of the delivery device. The one or more temperature sensors may also or alternatively be provided inside the compartment 240 and on one side of the controller 250 to detect an internal temperature of the compartment 240 and/or a temperature of the controller 250. In addition, the sensor 210 may include a compartment sensor configured to sense whether the delivery item is placed in and/or is in the compartment 240.

The communication device 220 may include a transceiver, a communication circuit, a communication processor, or the like which transmits and receives information using an antenna. Wi-Fi, WiBro, GSM (Global System for Mobile Communication), CDMA (Code Division Multiple Access), WCDMA (Wideband Code Division Multiple Access), UTSMA (Universal Access), TDMA (T), It is possible to communicate with the server 300 through various wireless communication methods such as LTE (Long Term Evolution). According to an example, the communication device 220 may request the server 300 to transmit the target temperature for the delivery item, and may receive the target temperature for the delivery item from the server 300.

The temperature managing device 230 may include a heat managing device and/or a heat managing controller 238 configured to control the heat management device. Accordingly, the temperature managing device 230 may allow and/or cause the temperature of the compartment 240 to be equal to a target temperature for transporting the delivery item (e.g., based on the delivery item being placed in the compartment 240. The temperature managing device 230 may control the flow of internal air in the delivery device 200 to manage temperature of the compartment 240 and one or more components (e.g., the controller 250) in the delivery device 200 while reducing and/or minimizing a current consumed by the controller 250 to maintain a specific range of temperature without being overheated. The details thereof will be described with reference to FIG. 4.

The compartment 240 may include a space provided to place delivery items. The compartment 240 may include a delivery box. The compartment 240 may be separately provided with a temperature controller and/or temperature sensor. The temperature controller may be controlled by the heat managing controller 238 to adjust the temperature in the compartment 240 to a target temperature (and/or specific range of temperature around the target temperature) for transporting the delivery item. For example, the temperature controller may be controlled based on a determination that the delivery item is placed and/or is in the compartment 240.

The controller 250 may be implemented by various processing devices, such as processor and/or a microprocessor (e.g., comprising a semiconductor chip) configured to operate according to and/or execute various instructions. The controller 250 may be connected (e.g., electrically and/or wirelessly) to the sensor 210, the communication device 220, the temperature managing device 230, and the compartment 240 via a wired cable and/or various circuits configured to transmit and/or receive electrical signals, such as control commands, and may transmit and/or receive an electrical signal, such as the control command, via a communication network, which may include a Controller Area Network (CAN) communication. In addition, the controller 250 may control the overall operation of the delivery device 200, and may control movement of the compartment 240 (e.g., control a mobility device and/or component of the delivery device 200, not illustrated).

Figure 3:
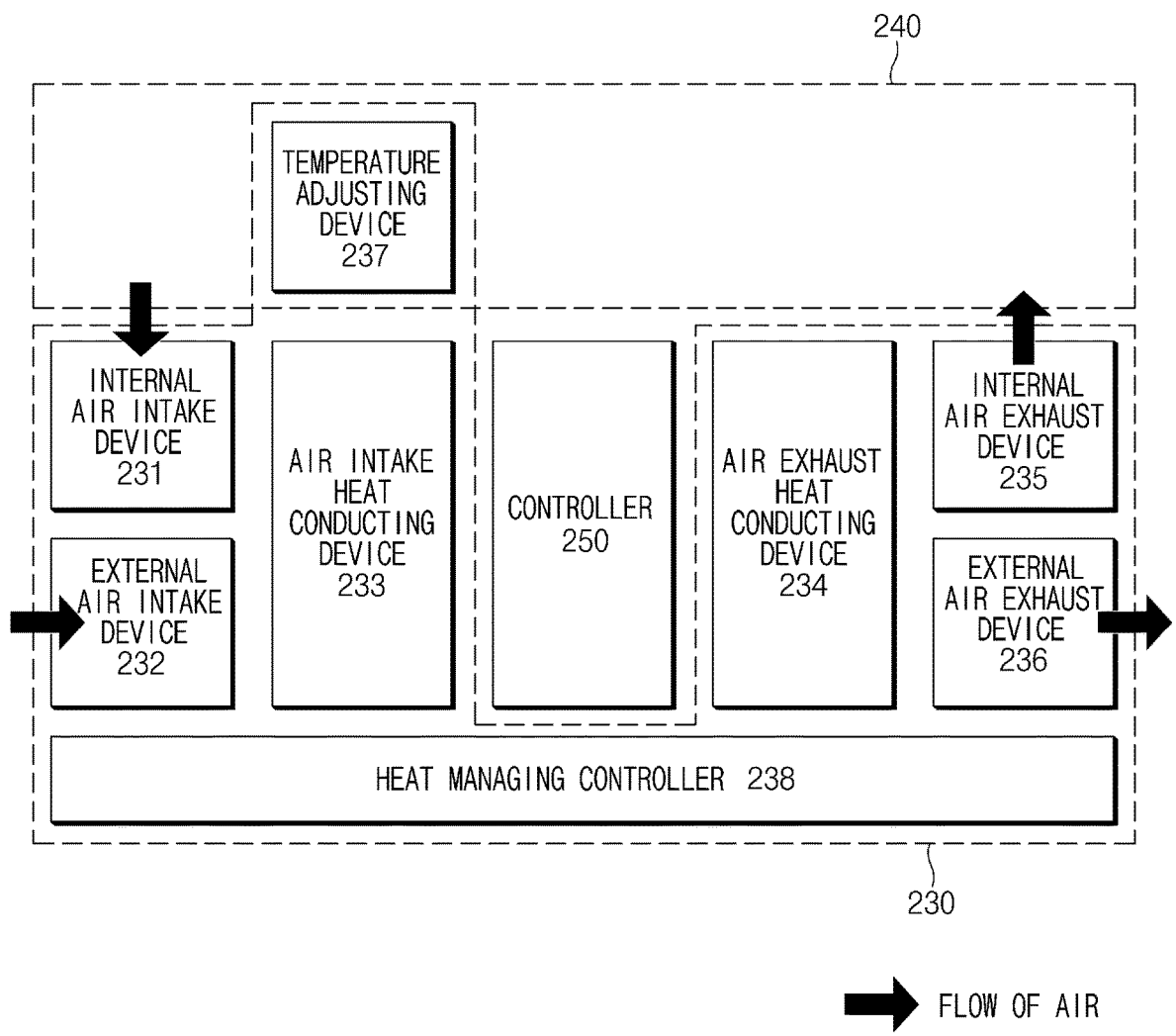
FIG. 3 is a view illustrating a configuration of a temperature managing device, according to an example of the present disclosure.

FIG. 3 is a view illustrating a configuration of a temperature managing device according to an example of the present disclosure.

As illustrated in FIG. 3, the temperature managing device 230 may include a heat managing device including an internal air intake device 231, an external air intake device 232, an air intake heat conducting device 233, an air exhaust heat conducting device 234, an internal air exhaust device 235, an external air exhaust device 236, and a temperature adjusting device 237, and a heat managing controller 238 configured to control the heat managing device.

The internal air intake device 231 may allow and/or cause air of the compartment 240 to be transmitted and/or directed to the air intake heat conducting device 233. According to an example, the internal air intake device 231 may be implemented as a blowing fan (e.g., of FIG. 4) to move air with directionality from one side to an opposite side (e.g., from inside the compartment 240 to outside the compartment 240). However, the internal air intake device 231 is not limited to the blowing fan, but can be varied as long as it is a device capable of generating and/or blocking the flow of air.

The external air intake device 232 may allow and/or cause external air of the delivery device 200 to be transmitted and/or directed to the air intake heat conducting device 233. According to an example, the external air intake device 232 may be implemented as a blowing fan (e.g., of FIG. 4) capable of moving air with directionality from one side to the other side (e.g., from external to the delivery device 200 to internal of the delivery device 200. However, the external air intake device 232 is not limited to a blowing fan, but may be changed as long as the external air intake device 232 is a device capable of generating or blocking the flow of air.

If air is transmitted from at least one of the internal air intake device 231, the external air intake device 232, or a combination thereof, the air intake heat conducting device 233 may allow the temperature of the air to be transmitted to the controller 250. According to the example, the air intake heat conducting device 233 may be implemented as a heat sink, but is not limited thereto, and may be varied as long as the air intake heat conducting device 233 is a device configured to transmit the temperature of air to the controller 250.

The air exhaust heat conducting device 234 may allow the temperature of the air of the controller 250 (e.g., air directed to and/or passing by the controller 250) to be transmitted to at least one of the internal air exhaust device 235, the external air exhaust device 236, or a combination thereof. According to an example, the air exhaust heat conducting device 234 may be implemented as a heat sink, but is not limited thereto, and may be varied as long as the air exhaust heat conducting device 234 is a device which transmits the temperature of air of the controller 250 to any one of the internal air exhaust device 235, the external air exhaust device 236, or the combination thereof.

The internal air exhaust device 235 may cause (e.g., move) and/or allow the air passing through the air exhaust heat conducting device 234 to be transmitted to the compartment 240. According to an example, the internal air exhaust device 235 may be implemented as a blowing fan (e.g., of FIG. 4) capable of moving air with directionality from one side to an opposite side. However, the internal air exhaust device 235 is not limited to the blowing fan, but may be varied as long as internal air exhaust device 235 is a device capable of generating or blocking the flow of air.

The external air intake device 232 may move the air passing through the air exhaust heat conducting device 234 and transmit the air to the outside of the delivery device 200. According to an example, the external air exhaust device 236 may be implemented as a blowing fan (e.g., of FIG. 4) capable of moving air with directionality from one side to an opposite side. However, the external air exhaust device 236 is not limited to the blowing fan, but may be varied as long as the external air exhaust device 236 is a device capable of generating or blocking the flow of air.

The temperature adjusting device 237 may be provided in the compartment 240 to adjust the temperature such that the compartment 240 is in a warm state or a cooling state. According to an example, the temperature adjusting device 237 may be implemented as a thermoelectric element capable of providing a Peltier effect.

The heat managing controller 238 may control the flow of air inside the delivery device 200 by controlling the heat managing device, to allow the temperature of the compartment 240 to become a target temperature for transporting the delivery item, as the delivery item is placed, and to minimize the current consumed by the controller 250 to maintain a specific range of temperature without being overheated.

Figure 4:
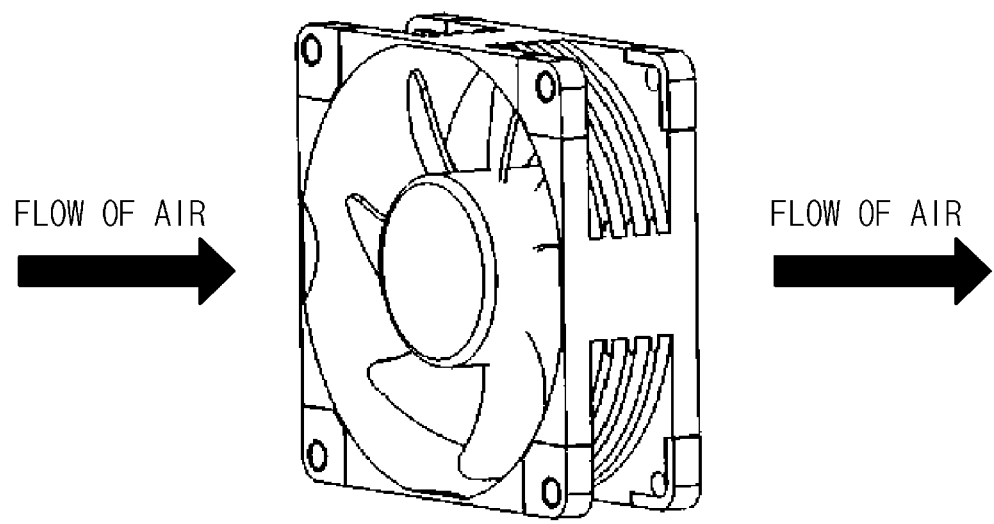
FIG. 4 is a view illustrating an example of an intake device and/or an exhaust device of the present disclosure.

FIG. 4 is a view illustrating an example of an intake device and an exhaust device of the present disclosure.

As illustrated in FIG. 4, according to an example of the present disclosure, the intake device and the exhaust device may move air with directionality from one side to an opposite side if power is applied and a fan is driven.

Figure 5:
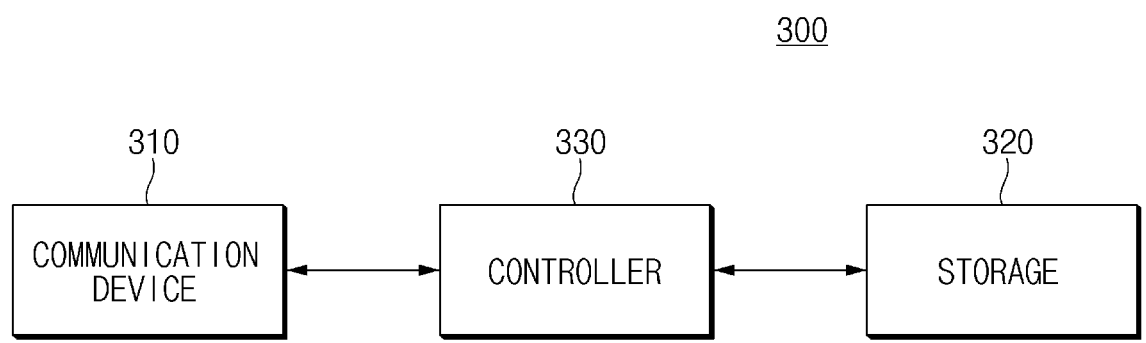
FIG. 5 is a view illustrating a configuration of a server, according to an embodiment of the present disclosure.

FIG. 5 is a view illustrating a configuration of a server, according to an embodiment of the present disclosure.

As illustrated in FIG. 5, the server 300 may include a communication device 310, a storage 320, and a controller 330.

The communication device 310 may include a transceiver, a communication circuit, or a communication processor to transceive information using an antenna, and may make communication with the delivery device 200 through various wireless communication schemes including Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LET). According to an embodiment, when the delivery device 200 requests the transmission of the target temperature for the delivery item, the communication device 310 may transmit the target temperature for the delivery item to the delivery device 200.

The storage 320 may store at least one algorithm to compute or execute various instructions for the operation of the server according to an embodiment of the present disclosure. In addition, the storage 320 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The controller 330 may be implemented by various processing devices, such as a microprocessor embedded therein with a semiconductor chip to operate or execute various instructions, and may control the operation of the server according to an embodiment of the present disclosure. The controller 330 may be electrically connected to the communication device 310 or the storage 320 through a cable or various circuits to transmit an electrical signal including a control command and may transmit or receive the electrical signal including the control command through various wireless communication network, such as a control area network (CAN).

The controller 330 may generate the target temperature for the delivery item, based on order information of the delivery item of a user. The controller 330 may transmit the target temperature corresponding to the order information to the delivery device 200, when the placing of the delivery item is sensed in the delivery device 200 and the target temperature for the delivery item is requested to be transmitted.

Figure 6:
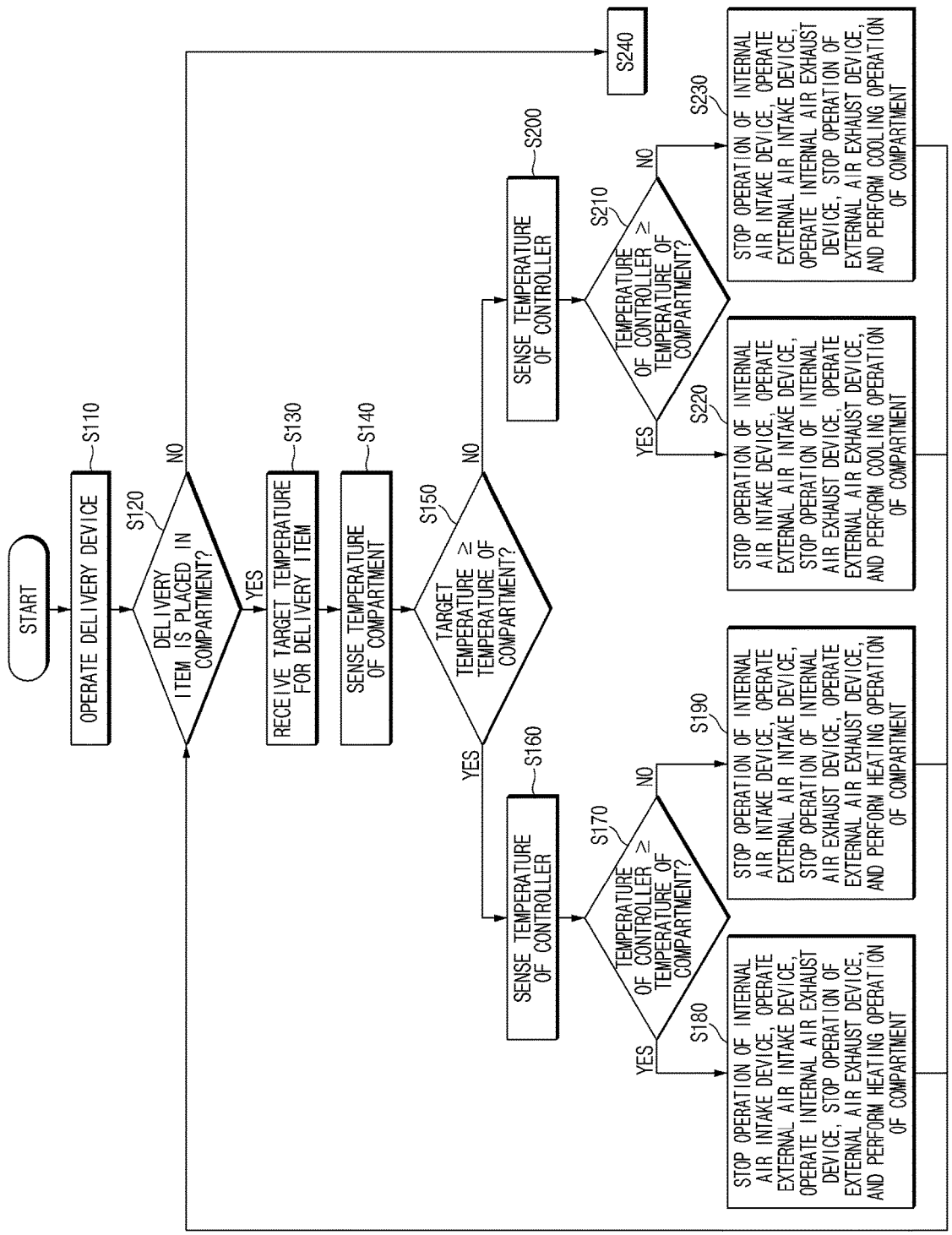
FIG. 6, FIG. 7, and FIG. 8 are views illustrating a method for controlling a delivery device, according to an example of the present disclosure.
Figure 7:
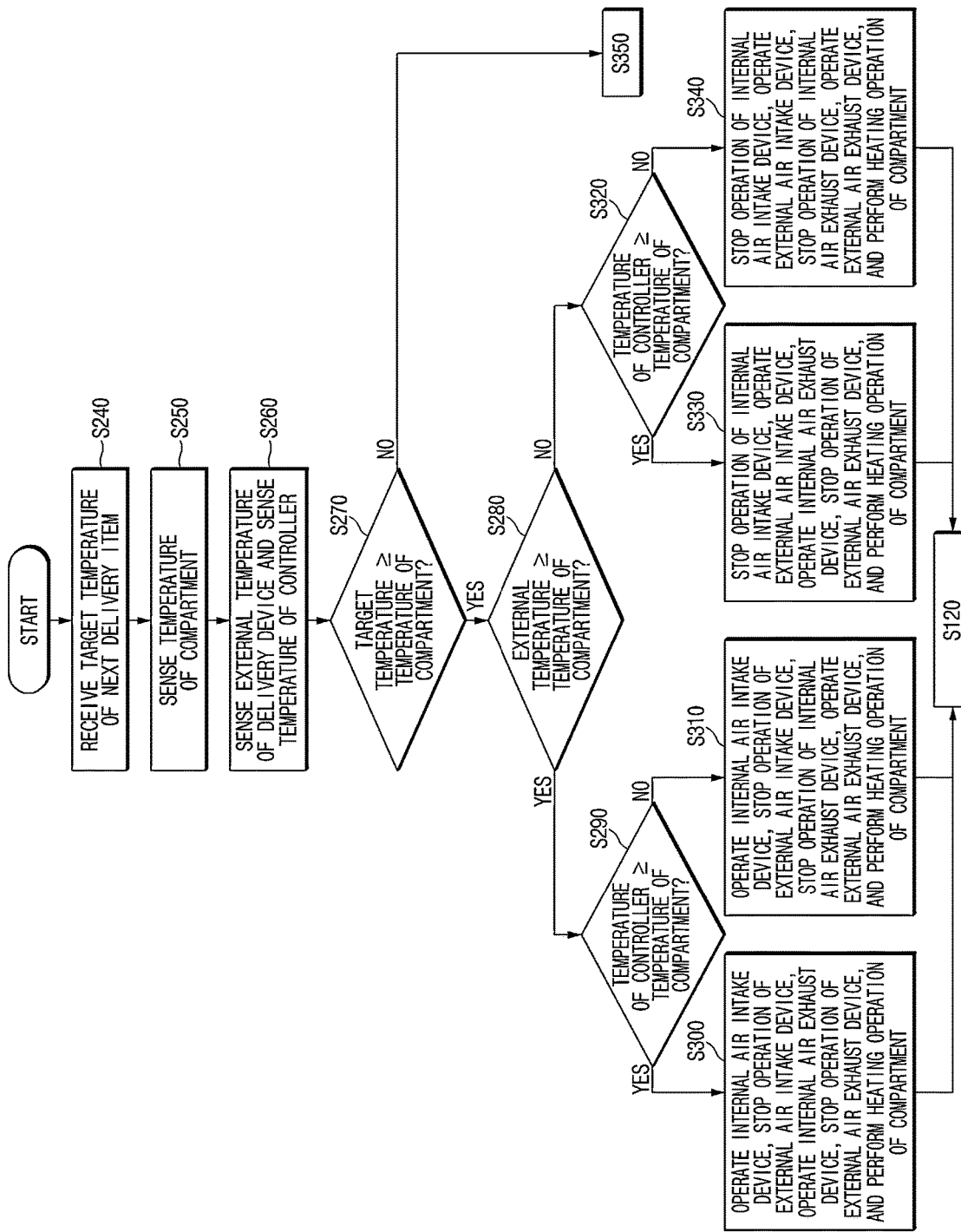
Figure 8:
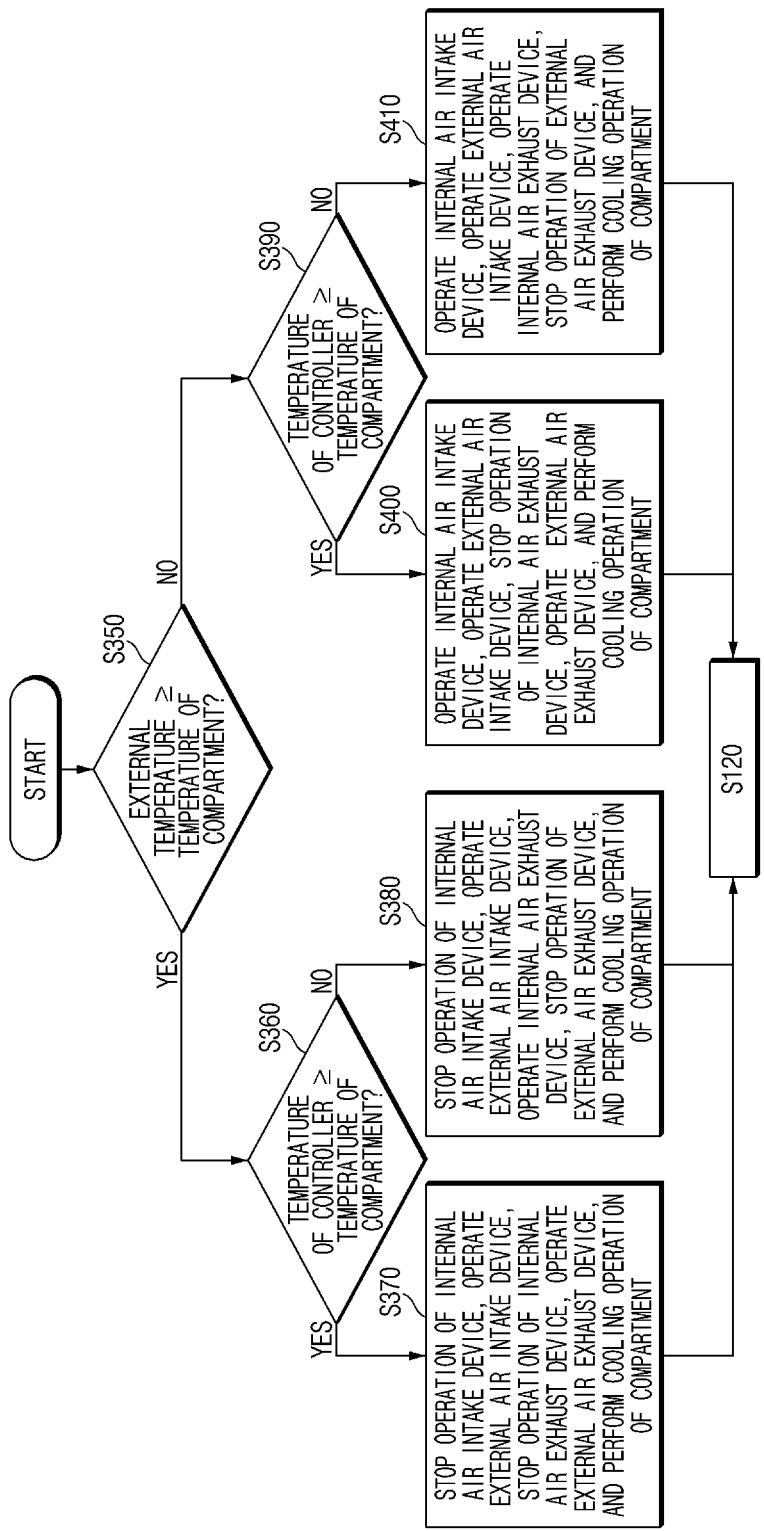

FIGS. 6 to 8 are views illustrating a method for controlling a delivery device, according to an example of the present disclosure.

As illustrated in FIG. 6, while the delivery device is being operated (S110), the heat managing controller 238 may determine whether the delivery item is in (e.g., placed in) the compartment 240 (S120).

In S120, if the heat managing controller 238 determines that the delivery item is in the compartment 240 (S120-Y), the server 300 may request the target temperature for the delivery item in the compartment 240 and/or send information indicating the delivery item is in the compartment 240.

The heat managing controller 238 may receive the target temperature for the delivery item from the server 300 (S130). The target temperature may have been sent by the server 300 in response to the request and/or the information indicating the delivery item.

The heat managing controller 238 may acquire the temperature of the compartment 240 sensed by the sensor 210 (S140). The heat managing controller 238 may determine whether the target temperature for the delivery item is equal to or greater than the temperature of the compartment 240 (S150).

In S150, if the target temperature for the delivery item is equal to or greater than the temperature of the compartment 240, the heat managing controller 238 may determine that the compartment 240 requires heat to become the target temperature for the delivery item.

The heat managing controller 238 may acquire a temperature of the controller 250 sensed by the sensor 210 (S160).

The heat managing controller 238 may compare the temperature of the controller 250 with the temperature of the compartment 240 to determine whether the temperature of the controller 250 is equal to or greater than the temperature of the compartment 240 (S170).

If the temperature of the controller 250 is equal to or greater than the temperature of the compartment 240 in S170, the heat managing controller 238 may determine that the controller 250 is heated and should be cooled.

The heat managing controller 238 may control the operation of the heat managing device, such that the compartment 240 is heated, and the air discharged from the controller 250 is transmitted to the compartment 240, e.g., based on the target temperature being equal to or greater than the temperature of the compartment 240 and the temperature of the controller 250 being equal to or greater than the temperature of the compartment 240.

According to an example, in S180, the heat managing controller 238 may control the heating operation to control the temperature adjusting device 237 to keep the compartment 240 warm, e.g., based on a determination that heating in the compartment 240 is required. The heat managing controller 238 may control the internal air intake device 231 not operate to prevent hot air from being discharged from the compartment 240.

In addition, the heat managing controller 238 may control the external air intake device 232 to operate to transmit external air of the delivery device to the controller 250, thereby cooling the controller 250.

The heat managing controller 238 may control the internal air exhaust device 235 to operate and control the external air exhaust device 236 to not transmit hot air of the controller 250 to the compartment 240, such that the heating efficiency of the compartment 240 is improved, which reduces the current used and/or needed to heat the compartment 240.

In S170, the heat managing controller 238 may determine that the controller 250 is not heated (e.g., may determine that the temperature of the controller 250 is less than the temperature of the compartment 240). Accordingly, the heat managing controller 238 may allow the compartment 240 to heat up. If the air discharged from the controller 250 is transmitted to the compartment 240, the heating efficiency of the compartment 240 may be lowered. Accordingly, the heat managing controller 238 may control the operation of the heat managing device to prevent the air discharged from the controller 250 from being transmitted to the compartment 240 (S190).

According to an example, in S190, the heat managing controller 238 may control the heating operation to control the temperature adjusting device 237 to keep the compartment 240 warm, because the compartment 240 should be heated, and may control the internal air intake device 231 not to operate to prevent the hot air of the compartment 240 from being discharged.

In addition, the heat managing controller 238 may control the external air intake device 232 to operate, such that the external air (hot air) of the delivery device is transmitted to the controller 250.

In addition, the heat managing controller 238 may control the internal air exhaust device 235 not to operate to prevent the cold air of the controller 250 from being transmitted to the compartment 240, such that the heating efficiency of the compartment 240 is improved. Accordingly, the heating efficiency of the compartment 240 may be improved.

By determining that the target temperature for the delivery item is less than the temperature of the compartment 240 in S150, the heat managing controller 238 may determine that the compartment 240 should be cooled, such that the temperature of the compartment 240 becomes the target temperature for the delivery item.

The heat managing controller 238 may acquire a temperature of the controller 250 sensed by the sensor 210 (S200).

The heat managing controller 238 may compare the temperature of the controller 250 with the temperature of the compartment 240 to determine whether the temperature of the controller 250 is equal to or greater than the temperature of the compartment 240 (S210).

In S210, by determining that the temperature of the controller 250 is equal to or greater than the temperature of the compartment 240, the heat managing controller 238 may determine that the controller 250 is heated and should be cooled.

The heat managing controller 238 may control the operation of the heat managing device to cool the compartment 240 and to discharge the air of the controller 250 to the outside, if the target temperature is less than the temperature of the compartment 240, and the temperature of the controller 250 is equal to or greater than the temperature of the compartment 240.

According to an example, in S220, the heat managing controller 238 may control a cooling operation to make the compartment 240 in a lower-temperature state by controlling the temperature adjusting device 237, because the compartment 240 should be cooled, and may perform a control operation to prevent the internal air intake device 231 from operating, to prevent the cold air of the compartment 240 from being discharged.

In addition, the heat managing controller 238 may control the external air intake device 232 to operate such that the external air of the delivery device is transmitted to the controller 250 to cool the controller 250 heated.

In addition, the heat managing controller 238 may control the internal air exhaust device 235 to prevent the hot air of the controller 250 from being transmitted to the compartment 240, and may control the external air exhaust device 236 to operate such that the hot air is discharged to the outside, thereby improving the heating efficiency of the compartment 240. Accordingly, the cooling efficiency of the compartment 240 may be improved.

If the temperature of the controller 250 is less than the temperature of the compartment 240 in S20, the heat managing controller 238 may determine that the controller 250 is not heated. Therefore, the heat managing controller 238 may control the operation of the heat managing device, such that the air discharged from the controller 250 is transmitted to the compartment 240 (S230) because if the compartment 240 is cooled and the air discharged from the controller 250 is transmitted to the compartment 240, the cooling efficiency of the compartment 240 is increased.

According to an example, in S230, the heat managing controller 238 may control the temperature adjusting device 237 to control the cooling operation such that the compartment 240 is at a low temperature, because the compartment 240 should be cooled, and may control to prevent the operation of the internal air intake device 231 such that the cold air of the compartment 240 is prevented from being discharged.

In addition, the heat managing controller 238 may control the external air intake device 232 to operate such that the external air (hot air) of the delivery device is transmitted to the controller 250.

In addition, the heat managing controller 238 may control the internal air exhaust device 235 to operate such that the cold air of the controller 250 is transmitted to the compartment 240 to improve the cooling efficiency of the compartment 240. Accordingly, the cooling efficiency of the compartment 240 may be improved.

In S120, by determining that the delivery item is not placed in the compartment 240, the heat managing controller 238 may perform S240. The operation after S240 will be described with reference to FIG. 7 below.

As illustrated in FIG. 7, if determining that the delivery item is not placed in the compartment 240, the heat managing controller 238 may request the target temperature of the next scheduled delivery item from the server 300.

The heat managing controller 238 may receive the target temperature of the next scheduled delivery item from the server 300 (S240).

The heat managing controller 238 may acquire the temperature of the compartment 240 sensed by the sensor 210 (S250), and may acquire the external temperature of the delivery device and the temperature of the heat managing controller 238 (S260).

The heat managing controller 238 may determine whether the target temperature for the delivery item is equal to or greater than the temperature of the compartment 240 (S270).

If the target temperature for the delivery item is equal to or greater than the temperature for the compartment 240 in S270, the heat managing controller 238 may determine that the compartment 240 should be heated, such that the temperature of the compartment 240 becomes the target temperature for the delivery item.

The heat managing controller 238 may determine whether the external temperature of the delivery device is greater than or equal to the temperature of the compartment 240 (S280).

By determining that the external temperature of the delivery device is equal to or greater than the temperature of the compartment 240 in S280, the heat managing controller 238 may determine that the inner part of the compartment 240 is relatively cool (the cold air is present). The heat managing controller 238 may compare the temperature of the controller 250 sensed by the sensor 210 with the temperature of the compartment 240 to determine that the temperature of the controller 250 is equal to or greater than the temperature of the compartment 240 (S290).

By determining that the temperature of the controller 250 is equal to or greater than the temperature of the compartment 240 in S290, the heat managing controller 238 may determine that the controller 250 is heated and should be cooled.

If the target temperature is equal to or greater than the temperature of the compartment 240, the external temperature of the delivery device is equal to or greater than the temperature of the compartment 240, and the temperature of the controller 250 is equal to or greater than the temperature of the compartment 240, the heat managing controller 238 may control the operation of the heat managing device to heat the compartment 240 and transmit the air discharged from the controller 250 to the compartment 240 (S300).

According to an example, in S300, the heat managing controller 238 may control the heating operation to control the temperature adjusting device 237 to keep the compartment 240 warm, because the compartment 240 should be heated, and may control the internal air intake device 231 to operate such that the relatively cool air inside the compartment 240 is discharged to improve the heating efficiency of the compartment 240.

In addition, if the temperature of the controller 250 is increased by increasing the intake temperature of the controller 250, the heat managing controller 238 may control the external air intake device 232 not to operate, such that the hot air of the controller 250 is used to heat the compartment 240.

In addition, the heat managing controller 238 may control the internal air exhaust device 235 to operate and the external air exhaust device 236 not to operate, such that that the hot air of the controller 250 is transmitted to the compartment 240 to improve the heating efficiency of the compartment 240, which minimizes a current consumed to heat the compartment 240.

In S290, by determining the temperature of the controller 250 is less than the temperature of the compartment 240, the heat managing controller 238 may determine that the controller 250 is not heated. Therefore, the heat managing controller 238 may heat the compartment 240, and may control the operation of the heat managing device to prevent air discharged from the controller 250 from being transmitted to the compartment 240, because the heating efficiency of the compartment 240 is reduced if the air (cold air) discharged from the controller 250 is transmitted to the compartment 240 (S310).

According to an example, in S310, the heat managing controller 238 may control the heating operation to control the temperature adjusting device 237 to keep the compartment 240 warm, because the compartment 240 should be heated, and may control the internal air intake device 231 to operate such that the relatively cool air inside the compartment 240 is discharged to improve the heating efficiency of the compartment 240.

In addition, if the temperature of the controller 250 is increased by increasing the intake temperature of the controller 250, the heat managing controller 238 may control the external air intake device 232 not to operate such that the hot air of the controller 250 is used for heat emission by the compartment 240.

In addition, the heat managing controller 238 may control the internal air exhaust device 235 to prevent the cold air of the controller 250 from being transmitted to the compartment 240 and control the external air exhaust device 236 to operate to discharge the cold air of the compartment 240 to improve the heating efficiency of the compartment 240, which minimizes the current consumed to emit heat from the compartment 240.

In S280, if the external temperature of the delivery device is less than the temperature of the compartment 240, the heat managing controller 238 may determine that the inner part of the compartment 240 is hot (hot air is present). The heat managing controller 238 may compare the temperature of the controller 250 sensed by the sensor 210 with the temperature of the compartment 240 to determine whether the temperature of the controller 250 is equal to or greater than the temperature of the compartment 240 (S320).

In S320, if determining that the temperature of the controller 250 is less than the temperature of the compartment 240, the heat managing controller 238 may determine that the controller 250 is heated and should be cooled.

The heat managing controller 238 may control the operation of the heat managing device to heat the compartment 240 and transmit the air discharged from the controller 250 to the compartment 240 if the target temperature is equal to or greater than the temperature of the compartment 240, the external temperature of the delivery device is equal to or greater than the temperature of the compartment 240, and the temperature of the controller 250 is equal to or greater than the temperature of the compartment 240 (S330).

According to an example, in S330, the heat managing controller 238 may control the heating operation to control the temperature adjusting device 237 to keep the compartment 240 warm, because the compartment 240 should be heated, and may control the internal air intake device 231 not to operate to prevent the internal hot air of the compartment 240 from being discharged to improve the heating efficiency of the compartment 240.

In addition, the heat managing controller 238 may control the external air intake device 232 to operate such that the external air of the delivery device is transmitted to the controller 250 to improve the cooling efficiency of the controller 250 heated.

In addition, the heat managing controller 238 may control the internal air exhaust device 235 to operate and control the external air exhaust device 236 not to operate, such that the hot air of the controller 250 is transmitted to the compartment 240 to improve the heating efficiency of the compartment 240, which minimizes the current consumed to emit heat from the compartment 240

In S320, by determining that the temperature of the controller 250 is less than the temperature of the compartment 240, the heat managing controller 238 may determine that the controller 250 is not heated. Accordingly, the heat managing controller 238 may control the compartment 240 to be heated and control the operation of the heat managing device to prevent the air discharged from the controller 250 from being transmitted to the compartment 240, because the heating efficiency of the compartment 240 is lowered, if the air (cold air) discharged from the controller 250 is transmitted to the compartment 240 (S340).

According to an example, in S340, the heat managing controller 238 may control the heating operation to control the temperature adjusting device 237 to keep the compartment 240 warm, because the compartment 240 should be heated, and may control the internal air intake device 231 not to operate to prevent the internal hot air of the compartment 240 from being discharged to improve the heating efficiency of the compartment 240.

In addition, the heat managing controller 238 may control the external air intake device 232 to operate such that the external air of the delivery device is transmitted to the controller 250 to improve the cooling efficiency of the controller 250 heated.

In addition, the heat managing controller 238 may control the internal air exhaust device 235 not to operate to prevent the cold air of the controller 250 from being transmitted to the compartment 240, and may control the external air exhaust device 236 to operate to discharge the external air of the delivery device, thereby improving the heating efficiency of the compartment 240, which minimize a current consumed to heat the compartment 240.

In S270, if the target temperature for the delivery item is less than the temperature of the compartment 240, the heat managing controller 238 may determine that the compartment 240 should be cooled such that the temperature of the compartment 240 becomes the target temperature of the delivery item, and may perform S350. The operations after S350 may be understood by making reference to the description made with reference to FIG. 8.

As illustrated in FIG. 8, if the target temperature is less than the temperature of the compartment 240, the heat managing controller 238 may determine that the compartment 240 should be cooled to be at a lower temperature, and may determine whether the external temperature of the delivery device is equal to or greater than the temperature of the compartment 240 (S350).

In S350, if the external temperature of the delivery device is equal to or greater than the temperature of the compartment 240, the heat managing controller 238 may determine that the inner part of the compartment 240 is relatively cool (the cold air is present), and the heat managing controller 238 may determine whether the temperature of the controller 250 is equal to or greater than the temperature of the compartment 240 by comparing the temperature of the controller 250 sensed by the sensor 210 with the temperature of the compartment 240 (S360).

In S360, by determining that the temperature of the controller 250 is equal to or greater than the temperature of the compartment 240, the heat managing controller 238 may determine that the controller 250 is heated and necessary to be cooled.

The heat managing controller 238 may control the operation of the heat managing device to cool the compartment 240 and prevent air discharged from the controller 250 from being transmitted to the compartment 240, if the target temperature is less than the temperature of the compartment 240, the external temperature of the delivery device is equal to or greater than the temperature of the compartment 240, and the temperature of the controller 250 is equal to or greater than the temperature of the compartment 240 (S370).

According to an example, in S370, the heat managing controller 238 may control a cooling operation such that the compartment 240 becomes in a lower temperature by controlling the temperature adjusting device 237, because the compartment 240 should be heated, and control the internal air intake device 231 not to operate to prevent internal air from the compartment 240 from being discharged, thereby improving the cooling efficiency of the compartment 240.

In addition, the heat managing controller 238 may control the external air intake device 232 to operate such that external air of the delivery device is transmitted to the controller 250 to improve the cooling efficiency of the controller 250 heated.

In addition, the heat managing controller 238 may control the internal air exhaust device 235 not to operate to prevent the hot air of the controller 250 from being transmitted to the compartment 240 and control the external air exhaust device 236 to operate, thereby improving the cooling efficiency of the compartment 240. Accordingly, the cooling efficiency of the compartment 240 may be improved.

In S360, if the temperature of the controller 250 is not less than the temperature of the compartment 240, the heat managing controller 238 may determine that the controller 250 is not heated. Therefore, the heat managing controller 238 may control the operation of the heat managing device such that the air discharged from the controller 250 is transmitted to the compartment 240 (S380), because if the compartment 240 is cooled and the air (cold air) discharged from the controller 250 is transmitted to the compartment 240, the cooling efficiency of the compartment 240 is improved.

According to an example, in S380, the heat managing controller 238 may control the cooling operation such that the compartment 240 is at a lower temperature by controlling the temperature adjusting device 237, because the compartment 240 should be heated. In addition, the heat managing controller 238 may control the internal air intake device 231 not to operate to prevent relatively cool air from being discharged from the inner part of the compartment 240, thereby improve the cooling efficiency of the compartment 240.

In addition, the heat managing controller 238 may control the external air intake device 232 to operate such that the external air (hot air) of the delivery device is transmitted to the controller 250 to improve the cooling efficiency of the controller 250.

In addition, the heat managing controller 238 may control the internal air exhaust device 235 to operate and control the external air exhaust device 236 not to operate to transmit the cold air of the controller 250 to the compartment 240, thereby improving the cooling efficiency of the compartment 240, which minimizes a current consumed to cool the compartment 240.

In S350, if the external temperature of the delivery device is less than the temperature of the compartment 240, the heat managing controller 238 may determine that the inner part of the compartment 240 is hot (the hot air is present). In addition, the heat managing controller 238 may determine whether the temperature of the controller 250 is equal to or greater than the temperature of the compartment 240 by comparing the temperature of the controller 250, which is sensed by the sensor 210, with the temperature of the compartment 240 (S390).

In S390, if the temperature of the controller 250 is equal to or greater than the temperature of the compartment 240, the heat managing controller 238 may determine that the controller 250 is heated and necessary to be cooled.

The heat managing controller 238 may cool the compartment 240 and control the operation of the heat managing device to prevent the air discharged from the controller 250 from being transmitted to the compartment 240, if the target temperature is less than the temperature of the compartment 240, the external temperature of the delivery device is less than the temperature of the compartment 240, and the temperature of the controller 250 is equal to or greater than the temperature of the compartment 240 (S400).

According to an example in S400, the heat managing controller 238 may control the cooling operation by controlling the temperature adjusting device 237 such that the compartment 240 is at a low temperature state, because the compartment 240 should be cooled. The heat managing controller 238 may control the operation of the internal air intake device 231 to discharge the internal hot air of the compartment 240, thereby improving the cooling efficiency of the compartment 240.

In addition, the heat managing controller 238 may control the external air intake device 232 to operate such that the external air of the delivery device is transmitted to the controller 250 to improve the cooling efficiency of the controller 250 heated.

In addition, the heat managing controller 238 may control the internal air exhaust device 235 not to operate, and control the external air exhaust device 236 to operate to prevent the hot air of the controller 250 from being transmitted to the compartment 240, thereby improving the cooling efficiency of the compartment 240, which minimizes the current consumed to cool the compartment 240.

In S390, by determining that the temperature of the controller 250 is less than the temperature of the compartment 240, the heat managing controller 238 may determine that the controller 250 is not heated. Accordingly, the heat managing controller 238 may control the operation of the heat managing device to cool the compartment 240 and to transmit the air (cold air) discharged from the controller 250 to the compartment 240, thereby improving the cooling efficiency of the compartment 240 (S410).

According to an example in S410, the heat managing controller 238 may control the cooling operation by controlling the temperature adjusting device 237 such that that the compartment 240 is in a low temperature state, and may control the internal air intake device 231 to operate to discharge the internal hot air of the compartment 240, thereby improving the cooling efficiency of the compartment 240.

In addition, the heat managing controller 238 may control the external air intake device 232 to operate to transmit the external air (cold air) of the delivery device is transmitted to the controller 250 to improve the cooling efficiency of the controller 250.

In addition, the heat managing controller 238 may control the internal air exhaust device 235 to transmit the cold air of the controller 250 to the compartment 240 and control the external air exhaust device 236 not to operate to prevent the external air of the delivery device from being discharged, thereby improving the cooling efficiency of the compartment 240, which minimizes the current consumed to cool the compartment 240.

Figure 9:
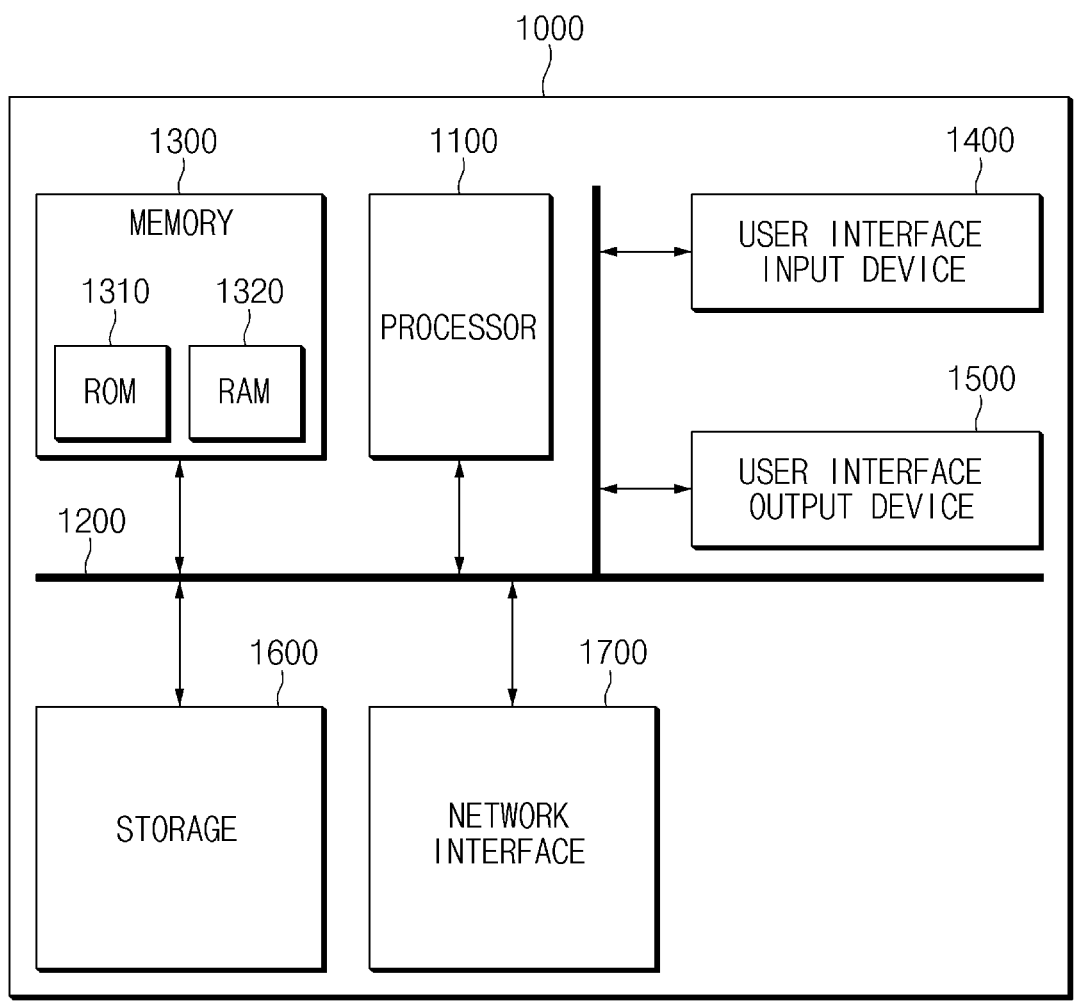
FIG. 9 is a block diagram illustrating a computing system to execute the method, according to an example of the present disclosure.

FIG. 9 is a block diagram illustrating a computing system to execute the method, according to an example of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a system bus 1200.

The at least one processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the examples disclosed in the present disclosure may be directly implemented with a hardware module, a software module, or the combinations thereof, executed by the at least one processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the at least one processor 1100. The at least one processor 1100 may read out information from the storage medium and may write information in the storage medium. Alternatively, the storage medium may be integrated with the at least one processor 1100. The processor and storage medium may reside in an application specific integrated circuit (ASIC). The ASIC may reside in a user terminal. Alternatively, the processor and storage medium may reside as separate components of the user terminal.

The present disclosure has been made to solve the above-mentioned problems occurring in the prior art while advantages achieved by the prior art are maintained intact.

An aspect of the present disclosure provides a system and a method for controlling a delivery device, capable of increasing the operating time and the cruising distance of the delivery device by minimizing current consumption required for the heating function of the delivery device and the cooling function of a controller.

Another aspect of the present disclosure provides a system and a method for controlling a delivery device, capable of determining whether heating or cooling of the delivery device is required, based on a target temperature for transporting a delivery item, if the delivery item is placed in the delivery device, and of comparing in temperature between a controller and the delivery device to determine whether the cooling of the controller is required, thereby controlling the temperature of the delivery device, and of controlling the operation of an intake device and an exhaust device to manage the internal heat of the delivery device to minimize the current consumption of the delivery device.

Another aspect of the present disclosure provides a system and a method for controlling a delivery device, capable of determining whether heating or cooling of the delivery device is required, based on a target temperature and an external temperature of a next delivery item, if a delivery item is not placed in the delivery device, and of comparing in temperature between a controller and the delivery device to determine whether the cooling of the controller is required, thereby controlling the temperature of the delivery device, and of controlling the operation of an intake device and an exhaust device to manage the internal heat of the delivery device to minimize the current consumption of the delivery device.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a delivery device, may include a server to transmit a target temperature for transporting a delivery item, and a delivery device to control a temperature of a compartment by determining whether the compartment should be heated or cooled, based on the target temperature for the delivery item, which is received from the server, if the delivery item is determined as being placed in the compartment, and control an operation of a heat managing device to control flow of air based on the temperature of a controller, which controls an operation of the delivery device, and the temperature of the compartment.

According to an example, the heat managing device may include a temperature adjusting device to adjust the temperature of the compartment, an internal air intake device to absorb air discharged from the compartment through an air intake heat conducting device, an external air intake device to absorb external air of the delivery device through the air intake heat conducting device, the air intake heat conducting device to transmit the absorbed air to the controller, an air exhaust heat conducting device to receive air discharged from the controller, an internal air exhaust device to discharge air discharged from the air exhaust heat conducting device to the compartment, and an external air exhaust device to discharge air discharged from the air exhaust heat conducting device out of the delivery device.

According to an example, the delivery device may control the operation of the heat managing device to heat the compartment and transmit air discharged from the controller to the compartment, if the target temperature is equal to or greater than the temperature of the compartment, and if the temperature of the controller is equal to or greater than the temperature of the compartment.

According to an example, the delivery device may control the operation of the heat managing device to heat the compartment and prevent air discharged from the controller from being transmitted to the compartment, if the target temperature is equal to or greater than the temperature of the compartment, and if the temperature of the controller is less than the temperature of the compartment.

According to an example, the delivery device may control the operation of the heat managing device to cool the compartment and prevent air discharged from the controller from being transmitted to the compartment, if the target temperature is less than the temperature of the compartment, and if the temperature of the controller is less than the temperature of the compartment.

According to an example, the delivery device may receive a target temperature for a next delivery item from the server, if the delivery item is not determined as being placed in the compartment.

According to an example, the delivery device may control the operation of the heat managing device to discharge air from the compartment, if the target temperature of the next delivery item is equal to or greater than the temperature of the compartment, and if an external temperature of the delivery device is equal to or greater than the temperature of the compartment.

According to an example, the delivery device may control the operation of the heat managing device to prevent air from the compartment from being discharged, if the target temperature of the next delivery item is equal to or greater than the temperature of the compartment, and if an external temperature of the delivery device is less than the temperature of the compartment.

According to an example, the delivery device may control the operation of the heat managing device to prevent air from the compartment from being discharged, if the target temperature of the next delivery item is less than the temperature of the compartment, and if an external temperature of the delivery device is equal to or greater than the temperature of the compartment.

According to an example, the delivery device may control the operation of the heat managing device to discharge air from the compartment, if the target temperature of the next delivery item is less than the temperature of the compartment, and if an external temperature of the delivery device is less than the temperature of the compartment.

According to another aspect of the present disclosure, a method for controlling a delivery device, may include receiving, from a server, a target temperature for transporting a delivery item, and controlling, by the delivery device, a temperature of a compartment by determining whether the compartment should be heated or cooled, based on the target temperature for the delivery item, which is received from the server, if the delivery item is determined as being placed in the compartment, and control an operation of a heat managing device to control flow of air based on the temperature of a controller, which controls an operation of the delivery device, and the temperature of the compartment.

According to an example, the heat managing device may include a temperature adjusting device to adjust the temperature of the compartment, an internal air intake device to absorb air discharged from the compartment through an air intake heat conducting device, an external air intake device to absorb external air of the delivery device through the air intake heat conducting device, the air intake heat conducting device to transmit the absorbed air to the controller, an air exhaust heat conducting device to receive air discharged from the controller, an internal air exhaust device to discharge air discharged from the air exhaust heat conducting device to the compartment, and an external air exhaust device to discharge air discharged from the air exhaust heat conducting device out of the delivery device.

According to an example, the controlling of the operation of the heat managing device may include controlling, by the delivery device, the operation of the heat managing device to heat the compartment and transmit air discharged from the controller to the compartment, if the target temperature is equal to or greater than the temperature of the compartment, and if the temperature of the controller is equal to or greater than the temperature of the compartment.

According to an example, the controlling of the operation of the heat managing device may include controlling, by the delivery device, the operation of the heat managing device to heat the compartment and prevent air discharged from the controller from being transmitted to the compartment, if the target temperature is equal to or greater than the temperature of the compartment, and if the temperature of the controller is less than the temperature of the compartment.

According to an example, the controlling of the operation of the heat managing device may include controlling, by the delivery device, the operation of the heat managing device to cool the compartment and prevent air discharged from the controller from being transmitted to the compartment, if the target temperature is less than the temperature of the compartment, and if the temperature of the controller is equal to or greater than the temperature of the compartment.

According to an example, the method may further include receiving, by the delivery device, a target temperature for a next delivery item from the server, if the delivery item is not determined as being placed in the compartment.

According to an example, the controlling of the operation of the heat managing device may include controlling, by the delivery device, the operation of the heat managing device to discharge air from the compartment, if the target temperature of the next delivery item is equal to or greater than the temperature of the compartment, and if an external temperature of the delivery device is equal to or greater than the temperature of the compartment.

According to an example, the controlling of the operation of the heat managing device may include controlling, by the delivery device, the operation of the heat managing device to prevent air from the compartment from being discharged, if the target temperature of the next delivery item is equal to or greater than the temperature of the compartment, and if an external temperature of the delivery device is less than the temperature of the compartment.

According to an example, the controlling of the operation of the heat managing device may include controlling, by the delivery device, the operation of the heat managing device to prevent air from the compartment from being discharged, if the target temperature of the next delivery item is less than the temperature of the compartment, and if an external temperature of the delivery device is equal to or greater than the temperature of the compartment.

According to an example, the controlling of the operation of the heat managing device may include controlling, by the delivery device, the operation of the heat managing device to discharge air from the compartment, if the target temperature of the next delivery item is less than the temperature of the compartment, and if an external temperature of the delivery device is less than the temperature of the compartment.

According to an example of the present disclosure, in the system and the method for controlling the delivery device, the operating time and the cruising distance of the delivery device may be increased by minimizing current consumption required for the heating function of the delivery device and the cooling function of the controller.

According to an example of the present disclosure, in the system and the method for controlling the delivery device, whether heating or cooling of the delivery device is required, may be determined based on the target temperature for transporting the delivery item, and a comparison in temperature between the controller and the delivery device may be compared to determine whether the cooling of the controller is required, thereby controlling the temperature of the delivery device, and the operation of an intake device and an exhaust device may be controlled to manage the internal heat of the delivery device to minimize the current consumption of the delivery device.

According to an example of the present disclosure, in the system and the method for controlling the delivery device, whether heating or cooling of the delivery device is required, may be determined based on a target temperature and an external temperature of a next delivery item, if a delivery item is not placed in the delivery device, and a comparison may be made in temperature between the controller and the delivery device to determine whether the cooling of the controller is required, thereby controlling the temperature of the delivery device, and the operation of the intake device and the exhaust device to manage the internal heat of the delivery device may be controlled to minimize the current consumption of the delivery device.

The above description is merely an example of the technical idea of the present disclosure, and various modifications and modifications may be made by one skilled in the art without departing from the essential characteristic of the disclosure.

Therefore, the exemplary examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

What is claimed is:

1. A delivery device comprising:
    a wireless communication interface configured to receive a signal indicating a target temperature for transporting a delivery item; and
    a compartment configured to accommodate the delivery item;
    a controller, comprising at least one processor and at least one memory, configured to control an operation of the delivery device;
    a first sensor configured to detect a temperature associated with the compartment;
    a second sensor configured to detect a temperature associated with the controller; and
    a heat managing device configured to control the temperature associated with the compartment by:
        during the delivery item being placed in the compartment, determining, by the delivery device, whether to increase or decrease the temperature associated with the compartment based on a comparison of the target temperature and the temperature associated with the compartment; and causing, by the delivery device, the heat managing device to control, by changing states of a plurality of air flow control devices, a flow of air within the delivery device based on:
  a comparison of the temperature associated with the controller and the temperature associated with the compartment; and
  the determining of whether to increase or decrease the temperature associated with the compartment; and a heat managing controller configured to minimize a current consumed by the controller to maintain a specific range of temperature by controlling the heat managing device, wherein the delivery device is configured to cause, based on the target temperature being less than the temperature associated with the compartment and the temperature associated with the controller being equal to or greater than the temperature of associated with the compartment, the heat managing device to prevent hot air discharged from the controller from being transmitted to the compartment, control external air of the delivery device to be transmitted to the controller, and control the hot air discharged from the controller to be discharged to outside.

2. The delivery device of claim 1, wherein the heat managing device comprises:
  a temperature adjusting device configured to adjust the temperature associated with the compartment;
  an internal air intake configured to direct air discharged from the compartment through an air intake heat conducting device;
  an external air intake configured to direct external air of the delivery device through the air intake heat conducting device;
  the air intake heat conducting device configured to transmit air directed therethrough to the controller;
  an air exhaust heat conducting device configured to receive air from the controller;
  an internal air exhaust configured to discharge air from the air exhaust heat conducting device to the compartment; and
  an external air exhaust device configured to discharge air discharged from the air exhaust heat conducting device out of the delivery device.

3. The delivery device of claim 1, wherein the delivery device is configured to cause, based on the target temperature being equal to or greater than the temperature associated with the compartment and the temperature associated with the controller being equal to or greater than the temperature associated with the compartment, the heat managing device to increase the temperature associated with the compartment and transmit air discharged from the controller to the compartment.

4. The delivery device of claim 1, wherein the delivery device is configured to cause, based on the target temperature being equal to or greater than the temperature associated with the compartment and the temperature associated with the controller being less than the temperature associated with the compartment, the heat managing device to increase the temperature associated with the compartment and prevent air discharged from the controller from being transmitted to the compartment.

5. The delivery device of claim 1, wherein the delivery device is configured to cause, based on the target temperature being less than the temperature associated with the compartment and the temperature associated with the controller being equal to or greater than the temperature associated with the compartment, the heat managing device to decrease the temperature associated with the compartment.

6. The delivery device of claim 1, wherein the delivery device is configured to, based on the delivery item not being detected in the compartment, receive, from a server, a signal indicating a target temperature for a next delivery item.

7. The delivery device of claim 6, wherein the delivery device is configured to cause, based on the target temperature of the next delivery item being equal to or greater than the temperature associated with the compartment and an external temperature of the delivery device being equal to or greater than the temperature associated with the compartment, the heat managing device to discharge air from the compartment.

8. The delivery device of claim 6, wherein the delivery device is configured to cause, based on the target temperature of the next delivery item being equal to or greater than the temperature associated with the compartment and an external temperature of the delivery device being less than the temperature associated with the compartment, the heat managing device to prevent air from the compartment from being discharged.

9. The delivery device of claim 6, wherein the delivery device is configured to cause, based on the target temperature of the next delivery item being less than the temperature associated with the compartment and an external temperature of the delivery device being equal to or greater than the temperature associated with the compartment, the heat managing device to prevent air from the compartment from being discharged.

10. The delivery device of claim 6, wherein the delivery device is configured to cause, based on the target temperature of the next delivery item being less than the temperature associated with the compartment and based on an external temperature of the delivery device being less than the temperature associated with the compartment, the heat managing device to discharge air from the compartment.

11. The delivery device of claim 1, wherein the delivery device is configured to change the states of the plurality of air flow control devices to control an air flow of external air between the compartment and an outside of the delivery device and an air flow of internal air between the compartment and a space accommodating the controller.

12. The delivery device of claim 1, wherein the plurality of air flow control devices comprises:
  an external air exhaust device;
  an internal air exhaust device;
  an external air intake device; and
  an internal air intake device.

13. A method performed by a delivery device comprising a wireless communication interface, a compartment, a controller, a first sensor, a second sensor, a heat managing device, and a heat managing controller, the method comprising:
  receiving, via the wireless communication interface of the delivery device, a signal indicating a target temperature for transporting a delivery item;
  detecting the delivery item placed in the compartment of the delivery device;
  controlling, by the controller of the delivery device, an operation of the delivery device;

detecting, by the first sensor of the delivery device, a temperature associated with the compartment;

detecting, by the second sensor of the delivery device, a temperature associated with the controller;

controlling, by the heat managing device of the delivery device, the temperature associated with the compartment by:

during the delivery item being placed in the compartment, determining, by the delivery device, whether to increase or decrease the temperature associated with the compartment based on a comparison of the target temperature and the temperature associated with the compartment; and causing, by the delivery device, the heat managing device to control, by changing states of a plurality of air flow control devices, a flow of air within the delivery device based on:

a comparison of the temperature associated with the controller and the temperature associated with the compartment; and the determining of whether to increase or decrease the temperature associated with the compartment;

minimizing, by the heating managing controller of the delivery device, a current consumed by the controller to maintain a specific range of temperature by controlling the heat managing device; and causing, by the delivery device based on the target temperature being less than the temperature associated with the compartment and the temperature associated with the controller being equal to or greater than the temperature associated with the compartment, the heat managing device to prevent hot air discharged from the controller from being transmitted to the compartment, control external air of the delivery device to be transmitted to the controller, and control the hot air discharged from the controller to be discharged to outside.

14. The method of claim 13, further comprising:

adjusting, by using a temperature adjusting device, the temperature associated with the compartment;

directing, via an internal air intake, air discharged from the compartment through an air intake heat conducting device;

directing, via an external air intake, external air of the delivery device through the air intake heat conducting device;

transmitting, by using the air intake heat conducting device air directed therethrough to the controller;

receiving, by an air exhaust heat conducting device, air from the controller;

discharging, via an internal air exhaust, air from the air exhaust heat conducting device to the compartment; and discharging, via an external air exhaust device, air discharged from the air exhaust heat conducting device out of the delivery device.

15. The method of claim 13, wherein the causing the heat managing device to control the flow of air comprises:

causing, by the delivery device based on the target temperature being equal to or greater than the temperature associated with the compartment and the temperature associated with the controller being equal to or greater than the temperature associated with the compartment, the heat managing device to increase the temperature associated with the compartment and transmit air discharged from the controller to the compartment.

16. The method of claim 13, wherein the causing the heat managing device to control the flow of air comprises:

causing, by the delivery device based on the target temperature being equal to or greater than the temperature associated with the compartment and the temperature associated with the controller being less than the temperature associated with the compartment, the heat managing device to increase the temperature associated with the compartment and prevent air discharged from the controller from being transmitted to the compartment.

17. The method of claim 13, wherein the causing the heat managing device to control the flow of air comprises:

causing, by the delivery device based on the target temperature being less than the temperature associated with the compartment and the temperature associated with the controller being equal to or greater than the temperature associated with the compartment, the heat managing device to decrease the temperature associated with the compartment.

18. The method of claim 13, further comprising:

receiving, by the delivery device from a server, a signal indicating a target temperature for a next delivery item, based on the delivery item not being detected in the compartment.

19. The method of claim 13, further comprising:

changing the states of the plurality of air flow control devices to control an air flow of external air between the compartment and an outside of the delivery device and an air flow of internal air between the compartment and a space accommodating the controller.

20. A delivery device comprising:

a wireless communication interface configured to receive a signal indicating a target temperature for transporting a delivery item; and a compartment configured to accommodate the delivery item;

a controller, comprising at least one processor and at least one memory, configured to control an operation of the delivery device;

a first sensor configured to detect a temperature associated with the compartment;

a second sensor configured to detect a temperature associated with the controller; and a heat managing device configured to control the temperature associated with the compartment by:

during the delivery item being placed in the compartment, determining, by the delivery device, whether to increase or decrease the temperature associated with the compartment based on a comparison of the target temperature and the temperature associated with the compartment; and causing, by the delivery device, the heat managing device to control, by changing states of a plurality of air flow control devices, a flow of air within the delivery device based on:

a comparison of the temperature associated with the controller and the temperature associated with the compartment; and the determining of whether to increase or decrease the temperature associated with the compartment; and a heat managing controller configured to control a current consumed by the controller to be reduced in maintaining a specific range of temperature by controlling the heat managing device, wherein the delivery device is configured to cause, based on the target temperature being less than the temperature associated with the compartment and the temperature associated with the controller being equal to or greater than the temperature of associated with the compartment, the heat managing device to prevent hot air discharged from the controller from being transmitted to the compartment, control external air of the delivery device to be transmitted to the controller, and control the hot air discharged from the controller to be discharged to outside.

* * * * *